United States Patent [19]

Nakamura et al.

[11] Patent Number: 4,806,779
[45] Date of Patent: Feb. 21, 1989

[54] SOLID-STATE IMAGE PICKUP APPARATUS USING STATIC INDUCTION TRANSISTORS FOR PERFORMING NON-DESTRUCTIVE READOUT

[75] Inventors: Junichi Nakamura, Ina; Toyokazu Mizoguchi, Tatsunomachi, both of Japan

[73] Assignee: Olympus Optical Co., Ltd., Tokyo, Japan

[21] Appl. No.: 66,424

[22] Filed: Jun. 25, 1987

[30] Foreign Application Priority Data

Jul. 26, 1986 [JP] Japan .................................. 61-176290

[51] Int. Cl.$^4$ ............................................... H04N 3/14
[52] U.S. Cl. .................................. 250/578; 358/213.12
[58] Field of Search ............................ 250/578, 211 J; 357/24 LT, 30; 358/212, 213.12

[56] References Cited

U.S. PATENT DOCUMENTS 4,571,624 2/1986 Nishizawa ........................... 250/578
4,636,865 1/1987 Imai ................................. 358/213.12

Primary Examiner—David C. Nelms
Assistant Examiner—Stephone B. Allen
Attorney, Agent, or Firm—Armstrong, Nikaido, Marmelstein & Kubovcik

[57] ABSTRACT

A solid-state image pickup apparatus having a plurality of row lines to which a row selection control signal is applied, a plurality of column lines to which a column selection control signal is applied, a plurality of static induction transistors whose source electrodes are connected to the column lines, capacitors which connects the gate electrodes of the static induction transistors to the row lines, column selecting transistors and resetting transistors connected to the column lines, in which, to perform non-destructive readout, the row selection control signal is set to low level when the resetting transistors operate. At the time of non-destructive readout, optical signal charges which have been accumulated in the capacitors are not discharged, so that outputs in accordance with optical signal charges can be read out again.

1 Claim, 10 Drawing Sheets

SOLID-STATE IMAGE PICKUP APPARATUS USING STATIC INDUCTION TRANSISTORS FOR PERFORMING NON-DESTRUCTIVE READOUT

BACKGROUND OF THE INVENTION

This invention relates to a solid-state image pickup apparatus in which static induction transistors (hereinafter referred to as SITs) which are capable of photoelectric conversion, amplification and switching are used.

To date, various types of solid-state image pickup apparatus, such as those using MOS transistors or those using charge coupled devices (CCDs) or BBDs been generally utilized. However, an apparatus using MOS transistors is disadvantageous in that its output signal level is very small and, hence, the signal-to-noise ratio thereof is small, and at the same time its photosensitivity is low. On the other hand, apparatuses using CCDs or BBDs display considerable losses of charge during the charge transfer operation and are difficult to produce.

To eliminate these defects, a type of solid-state image pickup apparatus such as that disclosed in Japanese Patent Publication No. 105672/1983 has been proposed, in which static induction transistors are used as picture elements.

The present inventors have proposed various solid-state image pickup apparatuses of improved types, based on the invention disclosed in the specification of the above publication. An example of one of them will be described below with reference to FIGS. 1A and 1B.

FIG. 1A shows the structure of one of picture elements of a solid-state image pickup apparatus constituted by SITs, and FIG. 1B shows the circuitry of this solid-state image pickup apparatus.

As shown in FIG. 1A, an $n^-$ epitaxial layer 2 which is to form a channel region is deposited on an $n^+$ silicon substrate 1 which serves as the drain of an SIT. A shallow $n^+$ source region is formed in the epitaxial layer 2, and this source region 3 is encircled by an $p^+$ gate region within the epitaxial layer 2. A MOS capacitor 5 is formed on the gate region 4 in such a manner that a pulse can be supplied through this capacitor 5. This structure is also provided with a separation region 6 for separating picture elements from each other.

In the SIT which constitutes the picture element structured in this manner, when the gate region 4 is reversely biased, a depletion layer is formed outside the gate region 4. If light is introduced into this depletion layer to form hole-electron pairs, electrons are swept into the source region 3 and the drain region 1, and positive holes are accumulated in the gate region. The gate potential is thereby raised, and the current from the drain to the source is modulated by this change in this voltage, so that a signal which has been amplified in accordance with the intensity of the light is obtained.

SITs 10-11, 10-12, ... 10-21, 10-22, ... , ... 10-44, which are disposed as illustrated in FIG. 1B, constitute picture elements which each have the structure shown in FIG. 1A. In this example, for convenience of description, the SITs are arranged in four rows horizontally and four columns vertically. Vertically-arranged sources of the SITs are connected in common to column lines 11-1, 11-2, ... 11-4 which are connected to a video line 14 via transistors 13-1, 13-2, ... 13-4 which constitute horizontal selection switches. The gates of the horizontal selection switches 13-1 to 13-4 are connected to a horizontal scanning circuit 15, and horizontal scanning pulses $\Phi_{S1}, \Phi_{S2}, \ldots \Phi_{S4}$ are applied to the gates.

On the other hand, horizontally-arranged gates of the SITs are respectively connected to row lines 12-1, 122, ... 12-4 via capacitors. The row lines 12-1, 122, ... 12-4 are connected to a vertical scanning circuit 16, and vertical scanning pulses $\Phi_{G1}, \Phi_{G2}, \ldots \Phi_{G4}$ are applied to the horizontally-arranged gates Of the SITs.

The other ends of the column lines 11-1, 11-2, ... 11-4, whose one ends are connected to the horizontal selection transistors 13-1, 13-2, ... 13-4, are respectively grounded via column line reset transistors 17-1, 17-2, ... 17-4. Column line reset pulses $\Phi_R$ are applied in common to the gates of the column line reset transistors.

When a vertical scanning pulse is applied to the corresponding row line so as to select a row of picture elements, and when a column of picture elements is selected by a horizontal scanning pulse, an optical signal current at the picture element at the point of intersection of the selected row and column is read out. In this way, by outputting horizontal and vertical scanning pulses in succession, the picture elements are successively scanned to obtain signals corresponding to one frame.

FIG. 2 is a signal waveform chart showing the timing of pulses operating the above described solid-state image pickup apparatus, and FIG. 3 is a circuit diagram of components related to a SIT which constitutes one picture element in this apparatus.

Referring to FIG. 2, each of the vertical scanning pulses $\Phi_G$ ($\Phi_{G1}, \Phi_{G2}, \Phi_{G3}$) for selecting gates is a pulse having two different high levels, namely a read level $V_{RD}$ and a reset level $V_{RS}$. The pulse is at the read level $V_{RD}$ during a horizontal scanning period ts for each row line, and at the reset level $V_{RS}$ during a horizontal blanking period $t_{BL}$ which follows the horizontal scanning period. Horizontal scanning pulses $\Phi_S$ ($\Phi_{S1}, \Phi_{S2}, \Phi_{S3}$) for selecting sources go high level in each horizontal scanning period, thereby successively scanning the horizontally-arranged picture elements. The reset pulse $\Phi_R$ is at high level during each horizontal blanking period $t_{BL}$ to reset the picture elements which have been read out.

In the circuit diagram shown in FIG. 3, $V_G$ is the gate potential of a picture element SIT($T_P$); $V_S$, the source potential; $C_{GD}$, the parasitic capacitance between the gate and the drain; $C_{GS}$, the parasitic capacitance between the gate and the source; $C_S$, the stray capacitance of the source line; $R_{ON}$, the on resistance of a horizontal selection MOS transistor $T_S$; and $T_R$, a resetting MOS transistor.

FIG. 4 shows the changes with time in the gate potential $V_G$ and the source potential $V_G$ of a picture-element SIT when the horizontal scanning pulse $\Phi_S$, the vertical scanning pule $\Phi_G$ and the reset pulse $\Phi_R$ are applied to the picture-element SIT in the solid-state image pickup apparatus. $\Phi_B$ represents the built-in voltage between the gate and the source, which will be described later.

The operation of the conventional apparatus at different points in time will be described below with reference to the accompanying drawings.

(1) At a time $t_1$ $\Phi_R$ reaches high level when $\Phi_G = V_{RS}$ ($>\Phi_B$), and the source potential $V_S$ is reset to GND so that $V_G = \Phi_B$.

(2) At a time $t_2$

The voltages of the pulses $\Phi_G$ and $\Phi_R$ become equal to GND, the gate potential $V_G$ becomes a reverse-biased voltage, as given by the following equation, so as to initiate optical integration:

$$V_{G2} = -\frac{C_G}{C_G + C_J} \cdot V_{RS} + \Phi_B \quad (1)$$

where $C_J = C_{GS} + C_{GD}$ (3) a time $t_3$

This is the time for the optical integration. At this time, a photoelectric charge $Q_{ph}$ generated by irradiation of light is accumulated in the gate capacity ($C_G + C_J$). This photo-electric charge $Q_{ph}$ is given by the equation:

$$Q_{ph} = G_L \cdot A \cdot P \cdot t_{int} = G_L \cdot A \cdot E \quad (2)$$

Where $G_L$ represents the generation rate ($\mu A/\mu W$), A represents the light receiving area (cm$^2$), P represents the irradiance of the light ($\mu W/cm^2$), tint represents the integration time (S), and E represents the exposure ($E = P \, t_{int}$)

The gate voltage $V_G$ is obtained from Equations (1) and (2) and is represented by the following equation:

$$V_{G3} = -\frac{C_G}{C_G + C_J} \cdot V_{RS} + \Phi_B + \frac{Q_{ph}}{C_G + C_J} \quad (3)$$

(4) At a time $t_4$

If, when $\Phi_G = V_{RD}$, the gate potential $V_G$ is $V_{G4}$:

$$V_{G4} = V_{G3} + \frac{C_G}{C_G + C_J} \cdot V_{RD} = \quad (4)$$

$$\frac{C_G}{C_G + C_J}(V_{RD} - V_{RS}) + \Phi_B + \frac{Q_{ph}}{C_G + C_J}$$

If $V_{G4} > V_P$, a drain current flows through the picture-element SIT, thereby charging the source line capacitance $C_S$. In the above inequality, $V_P$ is the potential difference between the gate and the source at which a drain current of the picture-element SIT begins to flow. This is called a pinch-off voltage. The above charging lasts until the potential difference $V_{GS}$ between the gate and the source becomes equal to $V_P$. Therefore, the source potential $V_S$ is given by Equation (5):

$$V_{S4} = \frac{C_G}{C_G + C_J}(V_{RD} - V_{RS}) + \Phi_B + \frac{Q_{ph}}{C_G + C_J} - V_P \quad (5)$$

Since $V_P < \Phi_B$, the rate of a current flowing from the p+ gate region to the n+ source region of the picture-element SIT is very small.

(5) At a time $t_5$

The horizontal scanning pulse $\Phi_S$ reaches high level, and the source line is connected to a load resistance $R_L$ via a MOS transistor $T_S$ (on resistance: $R_{ON}$). The Output $V_{OUT}$ thereof changes with time and is represented by Equation (6):

$$V_{S4} = \frac{C_G}{C_G + C_J}(V_{RD} - V_{RS}) + \Phi_B + \frac{Q_{ph}}{C_G + C_J} - V_P \quad (5)$$

FIG. 5 shows details of changes with time in the gate potential $V_G$, the source potential $V_S$ and the output $V_{OUT}$ of the picture-element SIT observed when the horizontal scanning pulse $\Phi_S$ reaches high level. As shown in FIG. 5, when the horizontal scanning pulse $\Phi_S$ reaches high level, the p+ gate and the n+ source of the picture-element SIT are set in the forward direction, so that a pn-diode current flows therethrough and a signal charge which has been accumulated in the gate capacity flows into the source. That is, the optical signal charge is destroyed so that both the gate potential $V_G$ and the source potential $V_S$ decrease Therefore, the output $V_{OUT}$ given by Equation (6) is smaller than a value obtained by substituting Equation (5) for $V_s(t)$ of Equation (6). $\Delta t$ represents a period of time in which the MOS transistor Ts is completely switched on after the horizontal scanning pulse $\Phi_S$ has risen, that is, a period of time in which the output $V_{OUT}$ reaches a peak value $\tilde{V}_{OUT}$ after the moment at which the pulse $\Phi_S$ rises.

As is clear from the above description, in the conventional solid-state image pickup apparatus using SITs as photoelectric conversion elements, optical signals are read out in the manner of so-called destructive readout in which an optical signal charge is discharged to read the signal. The output current thereof is remarkably larger than that of MOS sensors, but this method cannot answer the need for further increase in the output level.

SUMMARY OF THE INVENTION

The present invention has been achieved in consideration of various defects of the conventional solid-sate image pickup apparatus using SITs, and an object of the present invention is to provide a solid-state image pickup apparatus constituted by an extremely large number of picture elements, having an improved photosensitivity and a high picture element density, realizing high degree of performance, and capable of reading picture element signals in accordance with an integration time and within this integration time in the manner of non-destructive readout.

To this end, the present invention provides a solid-state image pickup apparatus having a plurality of row lines to which a row selection control signal is applied, a plurality of column lines to which a column selection control signal is applied, a plurality of static induction transistors whose source electrodes are connected to the column lines, capacitors which connects the gate electrodes of the static induction transistors to the row lines, column selecting transistors and resetting transistors connected to the column lines, in which, to perform non-destructive readout, the row selection control signal is set to low level when the resetting transistors operate.

This construction ensures that an optical signal charge accumulated in the gate capacitor of an SIT is prevented from discharging into the source at the time of nondestructive readout, thereby making it possible to extract the output again in response to this optical signal charge in the next readout period.

DESCRIPTION OF THE PREFERRED EMBODIMENTS

Solid-state image pickup apparatuses which represent preferred embodiments of the present invention will be described below with reference to the accompanying drawings.

Figure 6:
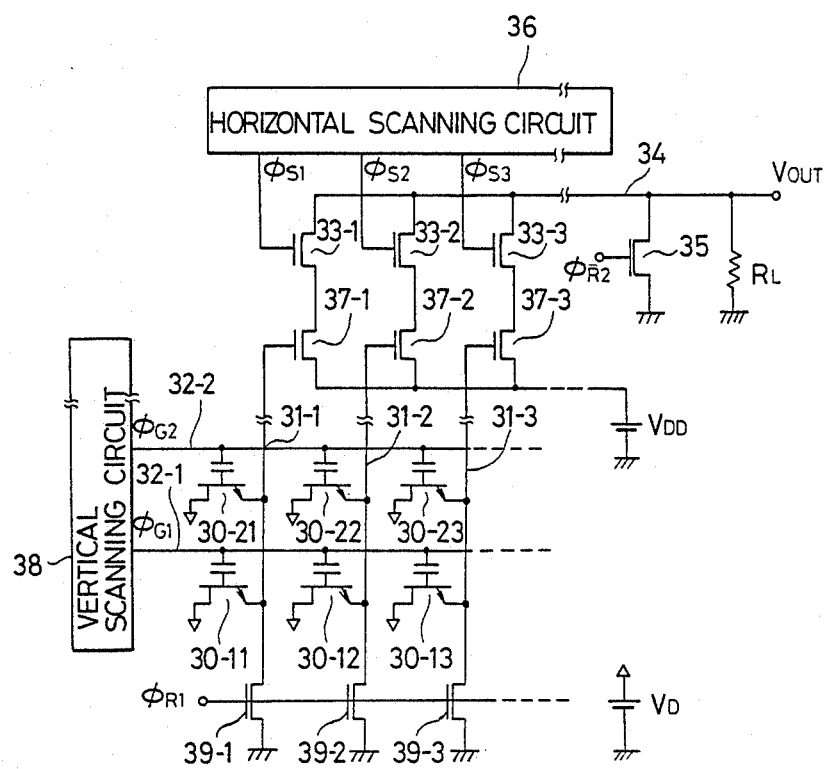
FIG. 6 is circuit diagram of a solid-state image pickup apparatus which represents a fundamental embodiment of the present invention.

FIG. 6 shows a circuitry of a solid-state image pickup apparatus which is an fundamental embodiment of the present invention. As shown in FIG. 6, SITs 30-11, 30-12, ... 30-23 are arranged vertically and horizontally in the form of a matrix. Vertically-arranged sources of the SITs are connected in common to column lines 31-1, 31-2, ..., and horizontally arranged gates of the SITs are respectively connected to row lines 32-1, 32-2, ... via capacitors. The column lines 31-1, 31-2, ... are connected to a video line 34 via transistors 33-1, 33-2, ... which constitute horizontal selection switches. A video line resetting transistor 35 is disposed on this video line 34. The gates of the transistors 33-1, 33-2, ... are connected to a horizontal scanning circuit 36, and horizontal scanning pulses $\Phi_{S1}$, $\Phi_{S2}$, ... are respectively applied to these gates. Switches 37-1, 37-2, ... constituted by MOS transistors are disposed on the column lines 31-1, 31-2, ..., but these switches may be omitted in other possible arrangements (not shown). The row lines 32-1, 32-2, ... are connected to a vertical scanning circuit 38, and vertical scanning pulses $\Phi_{S1}$, $\Phi_{G2}$, ... are respectively applied to the horizontally-arranged gates of the SITs. The other ends of the column lines 31-1, 31-2, ..., whose one ends are connected to the horizontal selection transistors 33-1, 33-2, ... are respectively grounded via column line reset transistors 39-1, 39-2, ... Column line reset pulses $\Phi_{R1}$ are applied in common to the gates of the column line reset transistors.

In the solid-state image pickup apparatus arranged as described above, when the pulse $\Phi_{R1}$ applied to the resetting transistors 39-1, 39-2, ... go high level after optical signals have been read out from picture elements consisting of SITs and capacitors, pulses $\Phi_{G1}$, $\Phi_{G2}$, ... which applied to row lines 32-1, 32-2, ... are set to low level, thereby obtaining outputs during the next readout period in accordance with optical signal charges accumulated in the gate capacitances of the SITs without destroying these optical signal charges.

Figure 7:
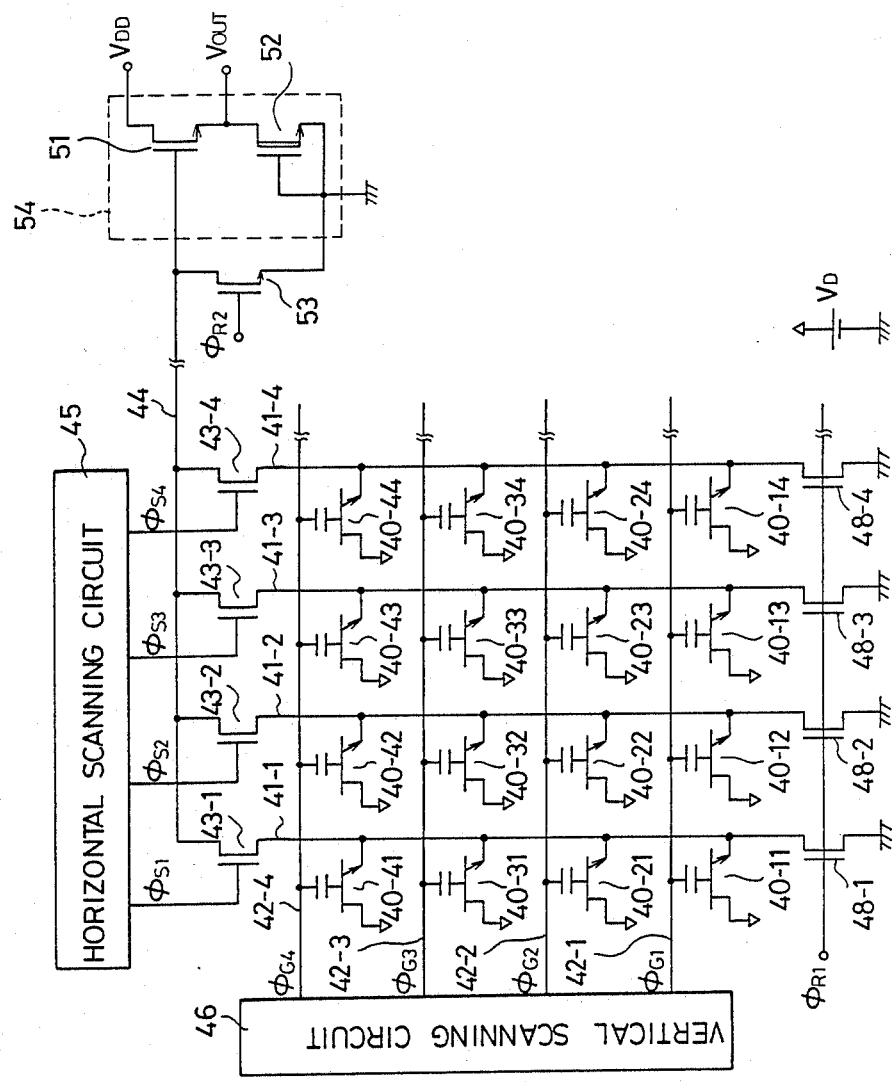
FIG. 7 is a circuit diagram of a solid-state image pickup apparatus which represents a second embodiment of the present invention.

FIG. 7 shows a circuitry of a second embodiment of the present invention in which a MOS transistor is used in place of a load resistance $R_L$ in the basic circuitry of the solid-state image pickup apparatus shown in FIG. 6.

Figure 8:
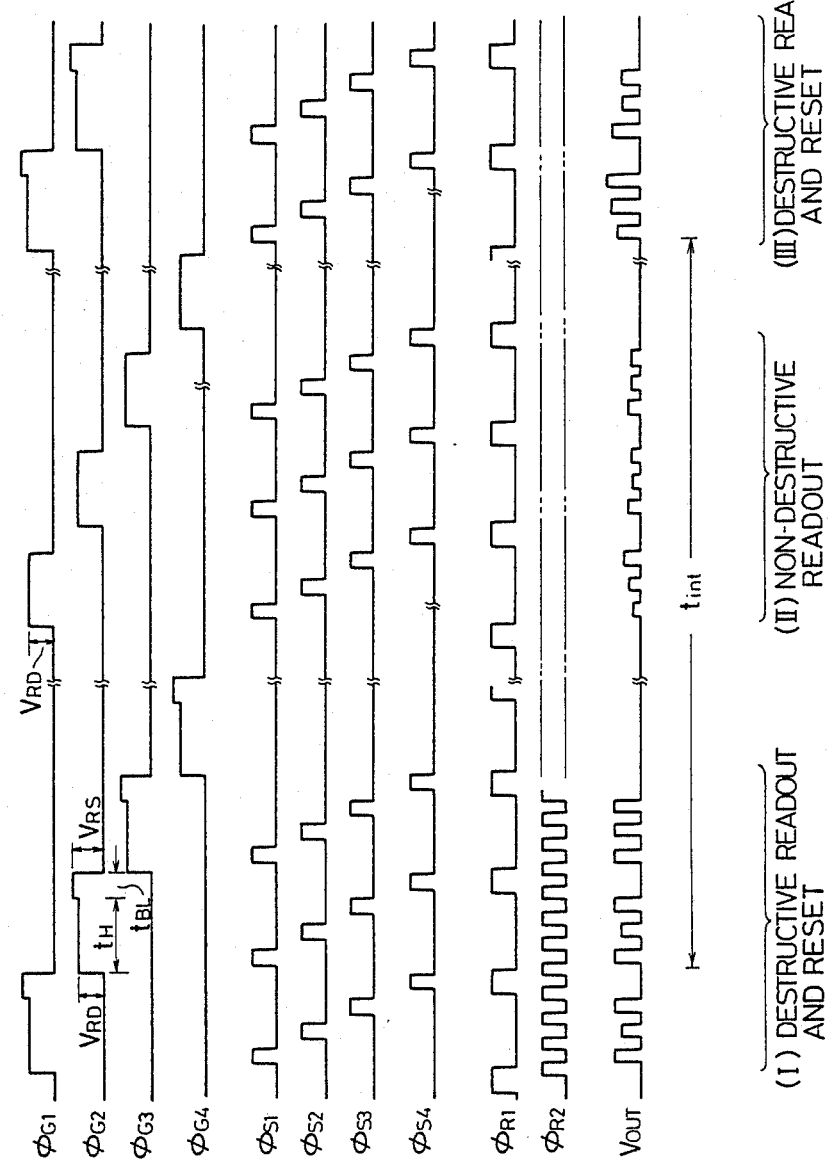
FIG. 8 is a signal waveform chart illustrating the operation of the second embodiment shown in FIG. 7.

FIG. 8 is a signal waveform chart in which pulses applied to the sources and the gates of the SITs, the timing of application of pulses to each reset transistor, and output signals are shown. The structure of a picture element in this embodiment is the same as that shown in FIG. 1A, and the description for it will not be repeated. In this embodiment, SITs which constitute picture elements are arranged, for convenience sake, in four rows horizontally and four columns vertically.

Figure 1A:
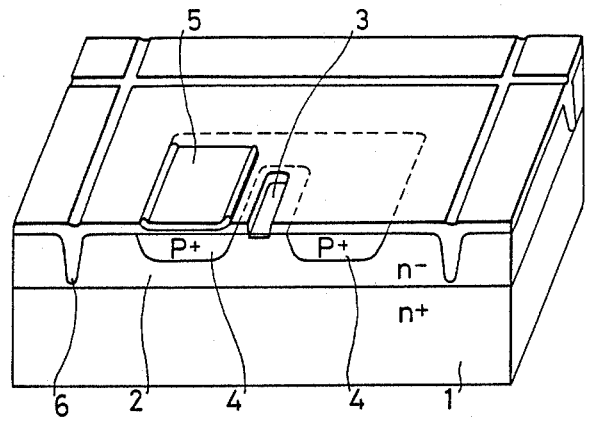
FIG. 1A is an illustration of the structure of one picture element of a conventional solid-state image pickup apparatus using SITs.
Figure 1B:
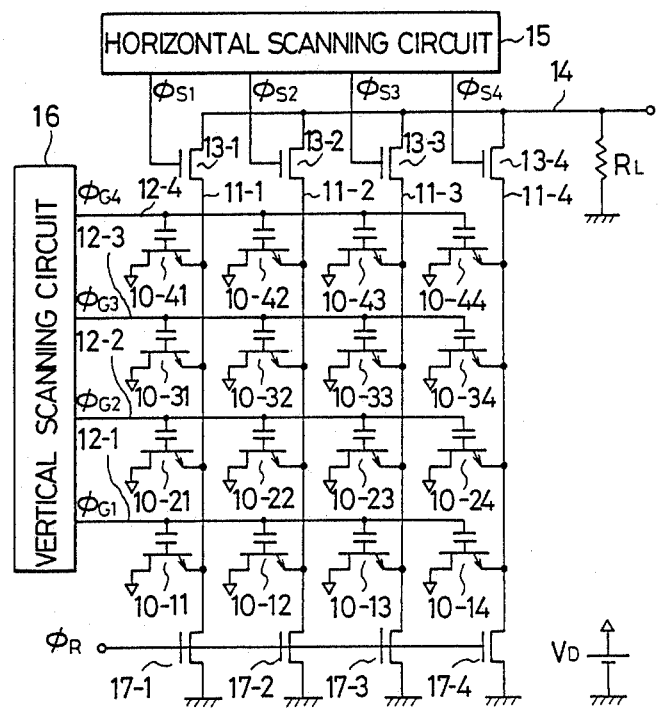
FIG. 1B is a circuit diagram of the solid-state image pickup apparatus of FIG. 1A.

As shown in FIG. 7, SITs 40-11, 40-12, ... 40-14, ... 40-21, 40-22, ... 40-24, ... 40-44 which constitute picture elements each having the same structure as that shown in FIG. 1A are arranged vertically and horizontally in the form of a matrix. Vertically-arranged sources of the SITs are connected in common to column lines 41-1, 41-2, ... 41-4 and horizontally arranged gates of the SITs are respectively connected to row lines 42-1, 42-2, ... 42-4 via capacitors. The column lines 41-1, 41-2, ... 41-4 are connected to a video line 44 via transistors 43-1 and 43-2, ... 43-4 which constitute horizontal selection switches.

The gate of an enhancement-type MOS transistor 51 is connected to this video line 44, and the source of this MOS transistor 51 is connected to the drain of a depletion-type MOS transistor 52 whose gate and source are grounded. The source of an enhancement-type MOS transistor 53, which is connected to the video line 44 and adapted for resetting this video line, is grounded at the same grounding point. The MOS transistors 51 and 52 constitute an amplifier 54 of an on-tip source follower type. The construction of this source follower amplifier 54 may be of a two-stage type. An electric potential source $V_{DD}$ is connected to the drain of the MOS transistor 51 Reset pulses $\Phi_{R2}$ are applied to the gate of the resetting MOS transistor 53. An image Output signal $V_{OUT}$ is supplied via the video line 44 and is picked up at the connection between the source of the MOS transistor 51 and the drain of the MOS transistor 52.

The other ends of the column lines 41-1, 41-2, ... 41-4, whose one ends are connected to the horizontal selection transistors 43-1, 43-2, ... 43-4, are respectively grounded via column line reset transistors 48-1, 48-2, ... 48-4. Column line reset pulses $\Phi_{R1}$ are applied in common to the gates of the column line reset transistors.

The gates of the transistors 43-1, 43-2, ... 43-4 constituting horizontal selection switches are connected to a horizontal scanning circuit 45, and horizontal scanning pulses $\Phi_{S1}$, $\Phi_{S2}$, ... $\Phi_{S4}$ are applied to the gates. The row lines 42-1, 42-2, ... 42-4 are connected to a vertical scanning circuit 46, and vertical scanning pulses $\Phi_{G1}$, $\Phi_{G2}$, ... $\Phi_{G4}$ are applied to the row lines.

FIG. 8 shows signal waveforms observed in a non-destructive readout operation effected within a predetermined integration time $t_{int}$.

Figure 2:
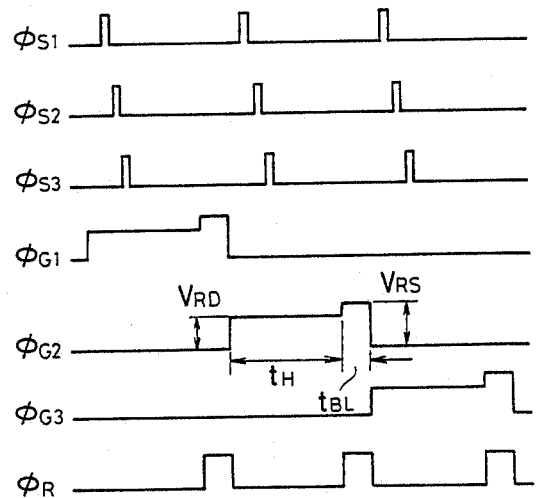
FIG. 2 is a signal waveform chart illustrating the operation of the conventional solid-state image pickup apparatus shown in FIG. 1B.
Figure 3:
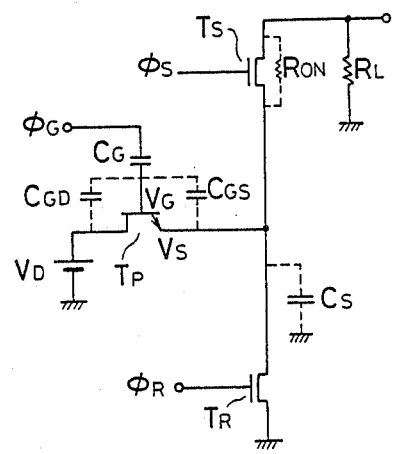
FIG. 3 is a circuit diagram corresponding to one picture element of the conventional solid-state image pickup apparatus shown in FIG. 1B.
Figure 4:
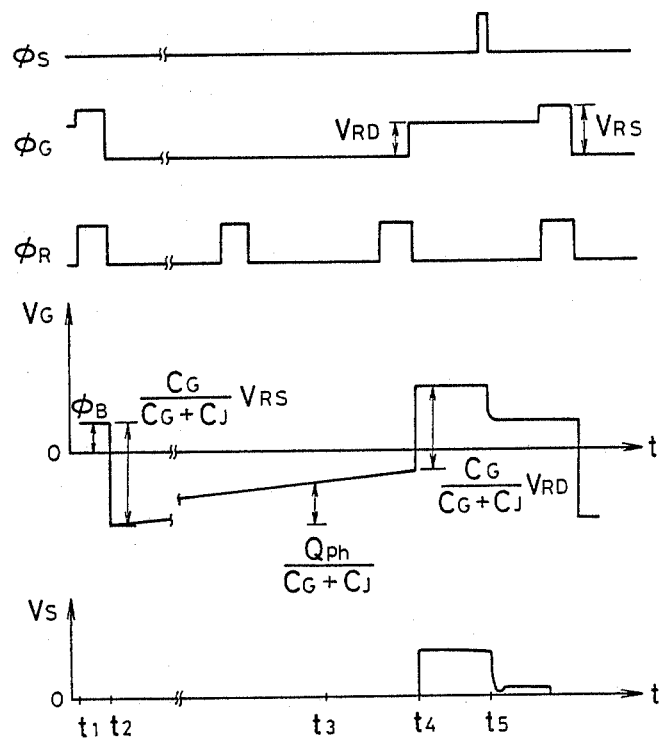
FIG. 4 is a signal waveform chart illustrating changes with time in the gate potential and the source potential observed when pulses are applied to a picture-element SIT of the conventional solid-state image pickup apparatus.

The integration is initiated by reading and resetting operations in a period (I). At this time, the readout operation (destructive readout) is performed in the same manner as that of the conventional apparatus described above with reference to FIGS. 2 and 4.

Figure 5:
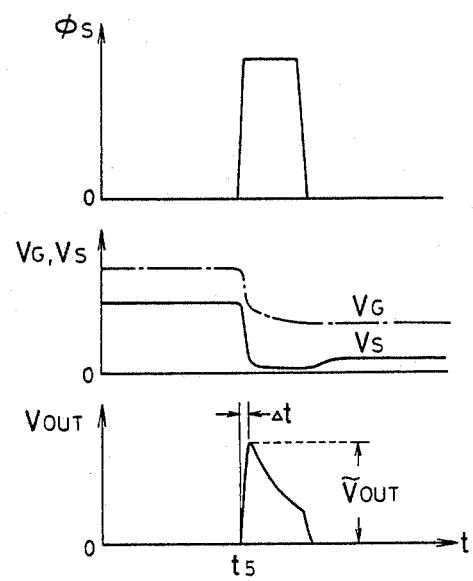
FIG. 5 is a signal waveform chart illustrating changes with time in the potential at each point observed when a pulse is applied to a picture-element SIT of the conventional solid-state image pickup apparatus.

In a non-destructive readout operation during a period (II), when $\Phi G1 = V_{RD}$, the source potential $V_S$ of an SIT reaches a value given by Equation (5). Since, as described above, $V_P < \Phi_B$, no current flows from the p+ gate to the n+ source of the SIT, and the source line capacitance $C_S$ is charged with a drain-source current of the SIT. When $\Phi_{S1}$ reaches high level, the potential $V_S$ of the source line is transmitted to the gate of the MOS transistor 51, and the output $V_{OUT}$ is:

$$V_{OUT} = a \cdot V_S = \quad (7)$$
$$a\left( \frac{C_G}{C_G + C_J}(V_{RD} - V_{RS}) + \Phi_B + \frac{Q_{ph}}{C_G + C_J} - V_p \right)$$

where a represents the gain (a<1) of the source-follower amplifier 54. There is no path through which a current can flow, and therefore an optical signal charge which has been accumulated in the gate of the SIT is maintained. In this embodiment, the level of Output is at most $V_{OUT} = a \cdot V_s$ (where a<1), but it is higher than that shown in FIG. 5, since this embodiment ensures that the source potential $V_S$ can be read out without being changed.

If $\Phi_G = GND$ by the timing corresponding to the moment at which $\Phi_G = V_{RS}$ holds in the readout system of the Conventional apparatus, that is, when the reset pulse $\Phi_{R1}$ applied to the resetting transistors 48-1, 48-2, . . . 48-4 reaches high level, the gate voltage can be restored, without resetting the SIT, to the value displayed when a pulse of $\Phi_G = V_{RD}$ is applied, thereby enabling the integration to be continued. That is, it is possible to effect non-destructive readout.

The optical signal charge is read out (in the manner of destructive readout) by reading and resetting operations in a period (III), and then a new operation of integration is initiated.

In the example shown in FIG. 8, only one operation of non-destructive readout is performed within a certain period of time, but this operation may be repeated as desired before the saturation of optical signal charge.

Figure 9:
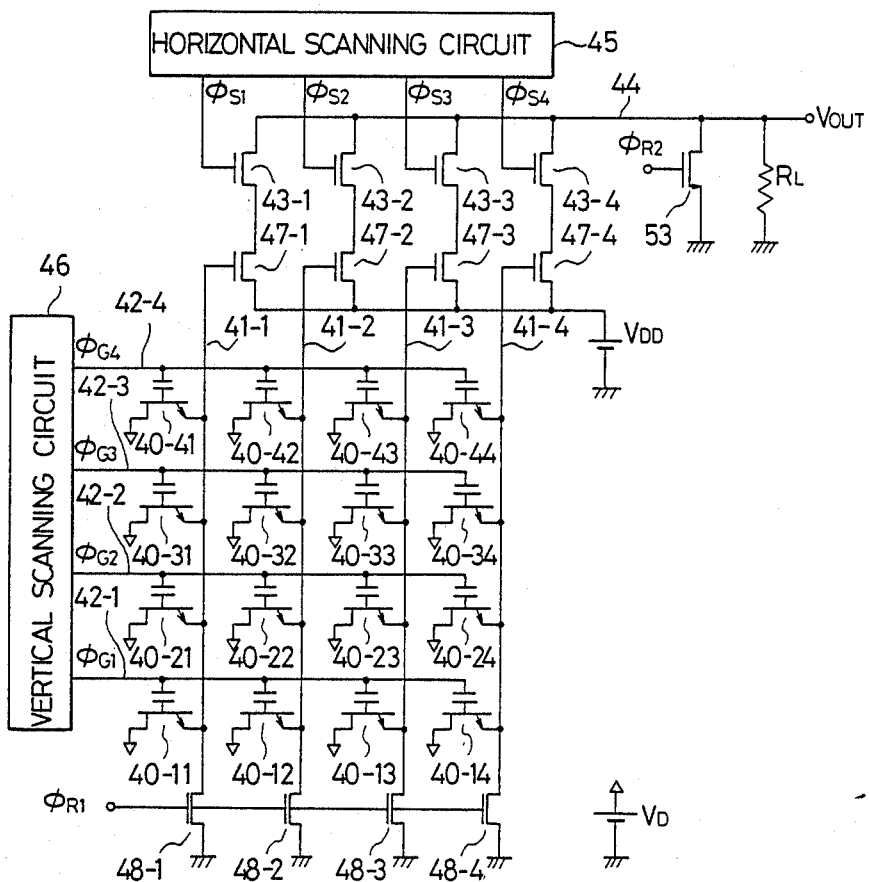
FIG. 9 is a circuit diagram of a solid-state image pickup apparatus which represents a third embodiment of the present invention.

FIG. 9 shows a circuitry of a third embodiment of the present invention in which elements having the same functions as those of the corresponding elements in the second embodiment shown in FIG. 7 are indicated by the same reference numerals. The description for such elements will not be repeated.

In this embodiment, MOS transistors 47-1, 47-2, . . . 47-4 are disposed between the transistors 43-1, 43-2, . . . 43-4 constituting the horizontal selection switches and the column lines 41-1, 41-2, . . . 41-4. The drains of the MOS transistors 47-1, 47-2, . . . 47-4 are wired from the surface thereof via electrodes and are connected in common to the power source $V_{DD}$.

The apparatus in accordance with this embodiment operates on the basis of the pulse timing shown in FIG. 8 in the same manner as in the case of the second embodiment. That is, when the gate selection pulse $\Phi_{G1}$ reaches a voltage level $V_{RD}$, the row line 42-1 is selected, and the potentials of the column lines 41-1, 41-2, . . . 41-4 are raised in response to the gate potentials of the SITs 40-11, 40-12, . . . 40-14 which constitute picture elements. Then, the source selection pulse $\Phi_{S1}$ reaches high level, and the transistor 43-1 which constitutes a horizontal selection switch is thereby turned on, so that the potential of the column (source) line 41-1 is read out via the MOS transistor 47-1 and the transistor 43-1, and hence a picture-element signal generated at the SIT 40-11 is read out.

Signals at the SITs 40-12, 40-13, 40-14 are thereafter successively read out in the same manner, and the reset pulse $\Phi_{R1}$ reaches high level during a succeeding horizontal blanking period, thereby resetting the SITs 40-11, 40-12, . . . 40-14 and the column lines 41-1, 41-2, . . . 41-4. Reading and resetting operations are thereafter performed in the same manner with respect to signals at picture elements constituted by the SITs 40-21, 40-22, . . . 40-31, 40-32, . . . 40-44, thereby obtaining signals corresponding to one frame.

In this embodiment also, if $\Phi_G = GND$ when the reset pulse $\Phi_{R1}$ applied to the resetting transistors 48-1, 48-2, . . . 48-4 reaches high level, the gate voltage can be restored, without resetting SITs, to the value displayed when a pulse of $\Phi_G = V_{RD}$ is applied, thereby enabling the integration to be continued.

Figure 10A:
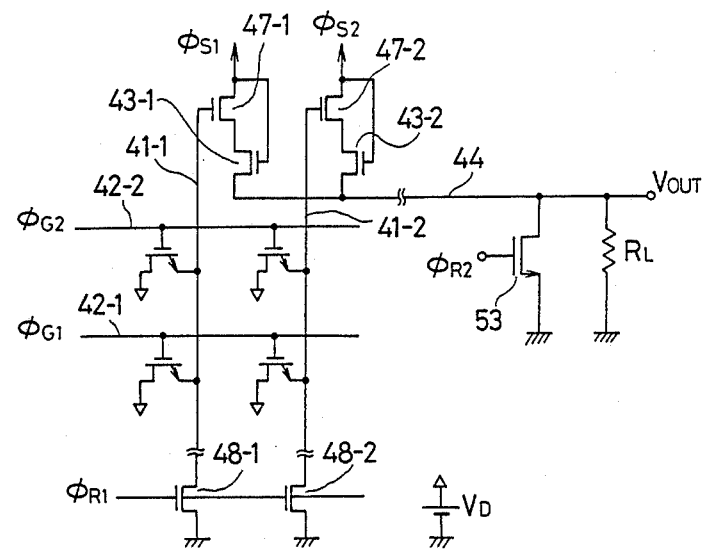
FIGS. 10A, 10B, 10C are circuit diagrams illustrating modifications of the third embodiment shown in FIG. 9.
Figure 10B:
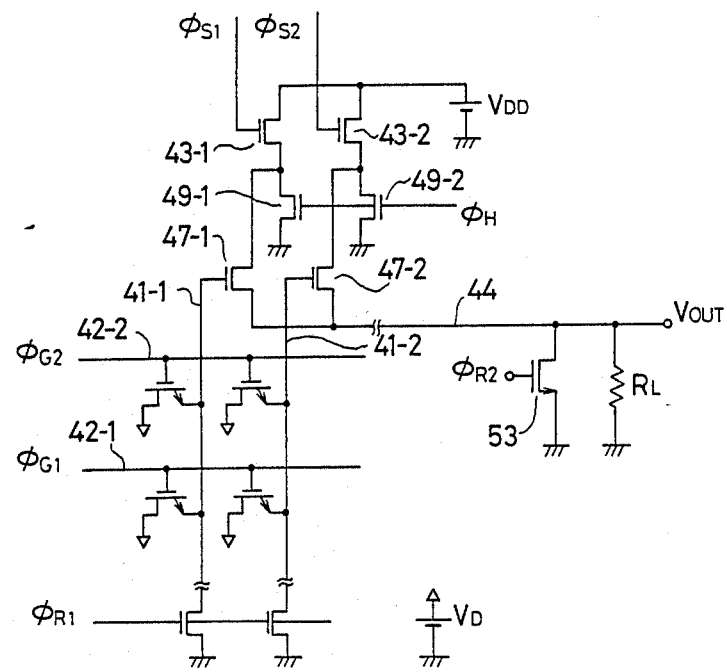
Figure 10C:
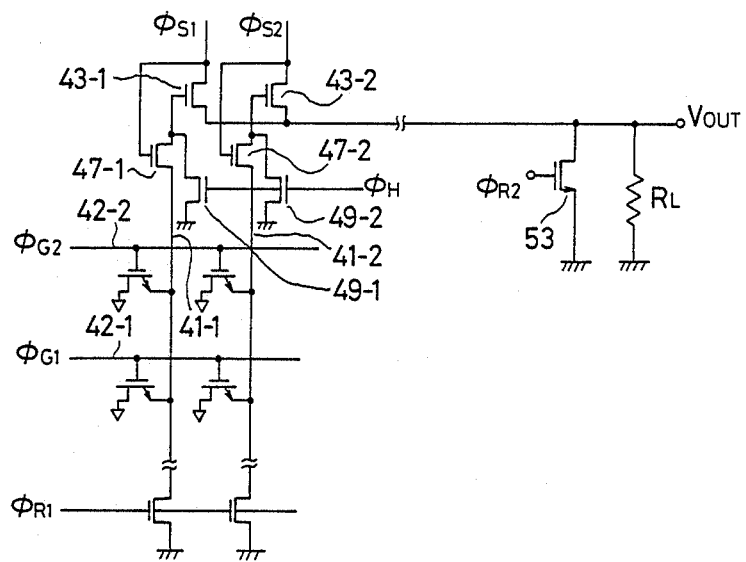
Figure 11:
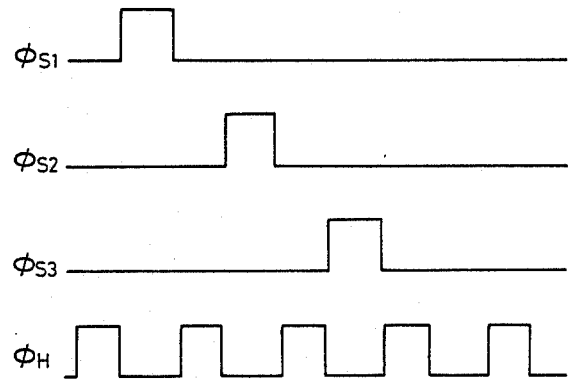
FIG. 11 is a signal waveform chart illustrating the operation of modified apparatuses shown in FIGS. 10B and 10C.

The circuitry of the solid-state image pickup apparatus using MOS transistors shown in FIG. 9 may be otherwise arranged. FIGS. 10A, 10B and 10C illustrate parts of examples of modifications in which elements having the same functions as those of the corresponding elements in the embodiment shown in FIG. 9 are indicated by the same reference numerals. FIG. 11 is a signal waveform chart in which the timing of operation pulses in accordance with the embodiment shown in FIGS. 10B and 10C is illustrated.

In the circuitry shown in FIG. 10A, the drains of the MOS transistors 47-1, 47-2, . . . are supplied with outputs $\Phi_{S1}$, $\Phi_{S2}$ . . . from the horizontal scanning circuit instead of being connected to the power source $V_{DD}$, thereby eliminating the need for wirings of the power source $V_{DD}$.

In the circuitry shown in FIG. 10B, the connections between the drains of the MOS transistors 47-1, 47-2, . . . and the power source $V_{DD}$ are switched on and off, and the sources of the MOS transistors 47-1, 47-2, . . . are connected in common to the load resistance $R_L$. MOS transistors 49-1, 49-2, . . . are connected to the connection points between the transistors 43-1, 43-2, . . . constituting the horizontal selection switches and the drains of the MOS transistors 47-1, 47-2, . . . , thereby enabling resetting of these connection points. The gates of the MOS transistors 49-1, 49-2, . . . are supplied with pulses $\Phi_H$ which act to turn on the transistors 49-1, 49-2, . . . during a period in which the horizontal scanning pulses $\Phi_{S1}$, $\Phi_{S2}$, . . . are at low level, as shown in FIG. 11.

In the circuitry shown in FIG. 10C, the connections between the column lines 41-1, 41-2, . . . and the gates of the MOS transistors 47-1, 47-2, . . . are switched on and off. MOS transistors 49-1, 49-2, . . . are connected to the connection points between the transistors 43-1, 43-2, . . . constituting the horizontal selection switches and the drains of the MOS transistors 47-1, 47-2, . . . , thereby enabling resetting of these connection points. The gates of the MOS transistors 49-1, 49-2, . . . are supplied with pulses $\Phi H$ which act to turn on the transistors 49-1, 49-2, . . . during a period in which the horizontal scanning pulses $\Phi_{S1}, \Phi_{S2}, \ldots$ are at low level, as shown in FIG. 11.

As described above in detail, the present invention provides a solid-state image pickup apparatus which is capable of performing non-destructive readout which cannot be realized by the conventional solid-state image pickup apparatus utilizing MOS transistors and CCDs. Therefore, the application of the present invention to a new type of image processing may be expected. In addition, the solid-state image pickup apparatus in accordance with the present invention can be readily provided since it may be produced in the conventional production process without any increase in the difficulty therein or in the production cost.

What is claimed is:

1. A solid-state image pickup apparatus, comprising:
   a plurality of row lines to which a row selection control signal is applied;
   a plurality of column lines to which a column selection control signal is applied;
   a plurality of static induction transistors whose source electrodes are connected to said column lines;
   capacitors which connect the gate electrodes of said static induction transistors to the row lines;
   transistors having gates connected to said column lines with or without switch intermediaries; and
   resetting transistors connected to said column lines, wherein, to perform non-destructive readout, said row selection control signal is set to low level when said resetting transistors operate.

* * * * *